United States Patent
Uchiyama et al.

(10) Patent No.: US 7,036,457 B2
(45) Date of Patent: May 2, 2006

(54) RODENT HOUSING RACK

(75) Inventors: Kenichi Uchiyama, Tokyo (JP); Shigeru Yanagihara, Tokyo (JP); Shoji Iwamiya, Tokyo (JP)

(73) Assignee: Tonets Corporation, Tokyo (JP)

( * ) Notice: Subject to any disclaimer, the term of this patent is extended or adjusted under 35 U.S.C. 154(b) by 0 days.

(21) Appl. No.: 10/847,451

(22) Filed: May 18, 2004

(65) Prior Publication Data

US 2005/0092257 A1 May 5, 2005

(30) Foreign Application Priority Data

Sep. 11, 2003 (JP) .............................. 2003-319178

(51) Int. Cl.
*A01K 1/03* (2006.01)
(52) U.S. Cl. ..................................... 119/419
(58) Field of Classification Search ................ 119/455, 119/417, 418, 419, 420, 456, 457, 458
See application file for complete search history.

(56) References Cited

U.S. PATENT DOCUMENTS

| | | | | |
|---|---|---|---|---|
| 4,343,261 A | * | 8/1982 | Thomas | 119/418 |
| 4,365,590 A | * | 12/1982 | Ruggieri et al. | 119/418 |
| 4,402,280 A | * | 9/1983 | Thomas | 119/418 |
| 4,798,171 A | * | 1/1989 | Peters et al. | 119/419 |
| 5,000,120 A | * | 3/1991 | Coiro et al. | 119/419 |

FOREIGN PATENT DOCUMENTS

| | | | |
|---|---|---|---|
| JP | 3057907 | | 3/1999 |
| JP | 2002-58373 | * | 2/2002 |

* cited by examiner

*Primary Examiner*—T. Nguyen
(74) *Attorney, Agent, or Firm*—Finnegan, Henderson, Farabow, Garrett & Dunner, L.L.P.

(57) ABSTRACT

The invention provides a rodent housing rack that effectively draws the air inside the cages out through exhaust vents.

The rodent housing rack comprises: a rack with multiple shelves 2 in which a plurality of cages 3 are arranged and stored, and where the shelves 2 are formed from shelf panels 4; cages 3 that are box-shaped containers having a rectangular-shaped opening that opens up the entire top surface; and an exhaust chamber located on the rear surface of the shelves 2 and that connects all of the shelves 2; and wherein negative pressure occurs inside the shelves 2 and causes air to flow in one-way from the front of the shelves 2 toward the rear; and wherein the space between the opening surface on the top of the cage 3 and the bottom surface of the shelf panel 4 above it is closed off by hanger partitions 5 that close off the top on the left and right sides of the cage and a back panel that comes in contact with the rear of the cage, such that only the front side of the space is open; and exhaust vents 9 are formed in the back panel such that the space above the cage is connected to the exhaust chamber through the vents.

8 Claims, 7 Drawing Sheets

RODENT HOUSING RACK

BACKGROUND OF THE INVENTION

1. Field of the Invention

This invention relates to a rodent housing rack for housing rodents used in laboratory experimentation.

2. Description of the Related Art

A negative-pressure one-way air flow rodent housing rack is known. In the negative-pressure one-way air flow rodent housing rack, by drawing air through the exhaust vents located on the rear surface of the shelves, negative pressure is created inside the shelves causing air to flow as a one-way air flow from the front surface of the shelves toward the rear surface. The laboratory animals are housed inside the cages in the condition that the room air flows through the shelves in one-way air flow from the front to the rear of the shelves without the odors and allergens from the animals inside the cages stored in the shelves escaping into the room.

On the other hand, a rodent housing rack, having doors on the front surfaces of part of the shelves, and that allows air to circulate inside the shelves by way of this opening has been proposed (see patent document: Japanese Utility patent registration No. 3,057,907).

However, in the case of the rodent housing rack that is disclosed in the patent document, when the doors are opened, the area of the opening on the front surface of the shelves becomes larger, and the velocity of the air taken in decreases and turbulent airflow occurs, thus there is a possibility that inside air of the cages will leak out into the room.

SUMMARY OF THE INVENTION

Taking the aforementioned problems into consideration, the object of this invention is to provide a rodent housing rack with simple construction that effectively draws air inside the cages out through the exhaust vents.

In order to accomplish the object of this invention, the invention according to claim 1 is a rodent housing rack that comprises: a multi-shelved rack in which a plurality of cages are arranged and stored, and wherein the shelves are formed from shelf panels; cages that are box-shaped containers having a rectangular-shaped opening that opens up the entire top surface; and an exhaust chamber located on the rear surface of the shelves and that connects all of the shelves; and wherein negative pressure occurs inside the shelves and causes air to flow in one-way from the front of the shelves toward the rear; and wherein the space between the opening surface on the top of the cage and the bottom surface of the shelf panel above it is closed off by hanger partitions that close off the top on the left and right sides of the top opening surface of each cage and a back panel that comes in contact with the rear of the cage, such that only the front side of the space is open; and exhaust vents are formed in the back panel such that the space above the cage is connected to the exhaust chamber through the vents.

In the invention according to claim 2, the entire front surface of the shelves is open.

In the invention according to claim 3, doors having a specified opening are located on the front surface of said shelves.

In the invention according to claim 4, the size of the openings in the front opening of the space above said cages are such that a reverse flow of air does not occur in said negative-pressure one-way airflow.

In the invention according to claim 5, said back panel is a plate that forms the front surface of said exhaust chamber.

In the invention according to claim 6, the plate on the front surface of the exhaust chamber has a protruding section that comes in contact with the back part of the cages.

In the invention according to claim 7, the cages are placed on top of the shelf panels and stored inside the shelves.

In the invention according to claim 8, the cages have rim sections that go around the top opening surface, and the left and right rim sections of the cages are hung on catch sections on the left and right hanger partitions such that the cages are suspended and stored inside the shelves.

EFFECT OF THE INVENTION

With the invention of claim 1, the space above the opening surfaces on the top of the cages stored in the shelves are closed off by a top panel (upper shelf panel), left and right hanger partitions and the back panel such that only the front side of the space above the cage is open; and since there are exhaust vents in the back panel, air flows into the cages from the front surface on the top of the cages, passes through the cages and is drawn out through the exhaust vents such that the air flows in one-way from the front surface to the rear surface. In other words, since only the front surface above the cage is open and the surface on the left and right sides are closed, air flows completely toward the back and is discharged from the exhaust vents on the rear surface without leaking from the side surfaces even when the temperature inside the cage rises. Therefore, it is possible to maintain one-way airflow such that air flows in from the front surface of the cage, passes through the cage and then flows out from the rear surface of the cage. Also, since airflow is separated for each cage, it is possible to prevent cross contamination between cages in the same shelf.

By installing shaped steel such as I-shaped or H-shape channel steel to the underneath surface of each shelf panel (ceiling panel of the shelf) as the hanger partitions, it is possible to easily form an enclosed space above each cage, that is separate for each cage.

With the invention of claim 2, one-way airflow is created without the use of doors by opening up the entire front surface of the shelves, so there is no need to open and close doors when taking out or putting cages or when performing cleaning or other maintenance work, and thus improves workability.

With the invention of claim 3, with the use of doors, the room is more completely separated from the inside of the shelves, thus improving the reliability of preventing cross contamination between the room and the inside of the shelves. Moreover, as described above, by having one or more specified openings on the top front side of the space above the cages, for example, openings having a size that does not allow reverse flow to occur in the negative-pressure one-way airflow (claim 4), and by further having openings with a specified size on the doors, it is possible to further reliably create one-way airflow that flows from the front surface of the shelves to the rear surface.

With the invention of claim 4, air flows into the cage from the front surface above the cage and flows at a constant airflow through the cage, and it is possible to maintain one-way air flow through the space above the cage even when an upward flow of warm air occurs inside the cage due to the body temperature of the animals in the cage. In this case, when the opening on the front side of the space above the cage is too large, the force of the airflow of air drawn into the cage through the opening becomes too weak, and there is a possibility that the airflow will be pressed back and returned by the upward flowing warm air due to the rise in temperature inside the cage causing reverse flow to occur in the one-way airflow. Therefore, in order to avoid this, the size of the opening should be set such that reverse flow does not occur in the one-way airflow, taking the flow amount of air, the volume of the cage and the rise in temperature inside the cage into consideration.

With the invention of claim 5, an exhaust chamber is located in the back of the shelves, and by using the plate of the front surface of this exhaust chamber as the back panel of the enclosed space above the cage, construction is simplified and there is no need to use a new plate material, and by storing each cage inside the shelf such that it comes in contact with the exhaust chamber on the rear surface of the shelf, it is possible to easily create an enclosed space for one-way airflow.

With the invention of claim 6, a protruding section is formed in the plate of the front surface of the exhaust chamber, and by having this rear end of the cages come in contact with this protruding section, it is possible to completely form an enclosed space above the cages. In this case, a space is formed on the underneath side of the protruding section which the cage comes in contact with. This space is located between the rear surface of the cage and the front surface of the exhaust chamber, so it is possible to place a water-supply nozzle in this space.

With the invention of claim 7, construction is simple regardless of the shape of the cages and shelves, so it is possible to improve versatility of the rack.

With the invention of claim 8, not only are both the left and right sides of the opening above the cages completely closed off, but also it is easy to clean the bottom surface of the shelf underneath the cages.

DESCRIPTION OF THE PREFERRED EMBODIMENTS

Figure 1:
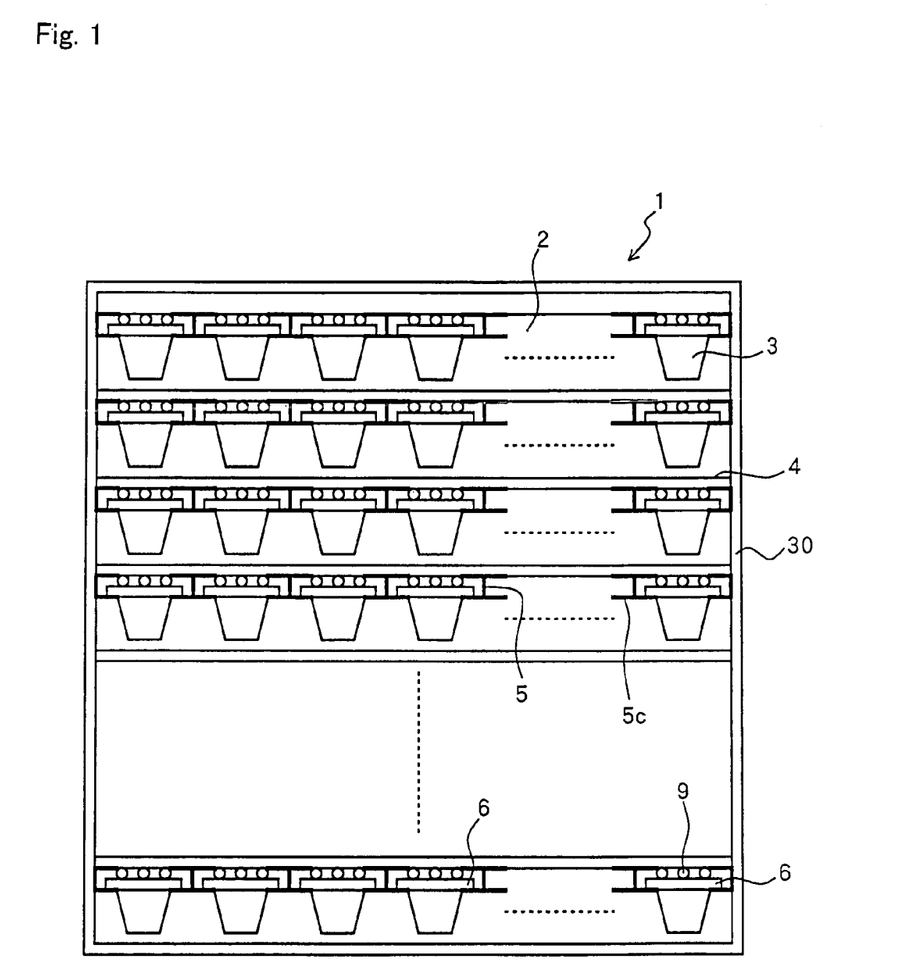
FIG. 1 is a front view of the rodent housing rack of this invention.
Figure 2:
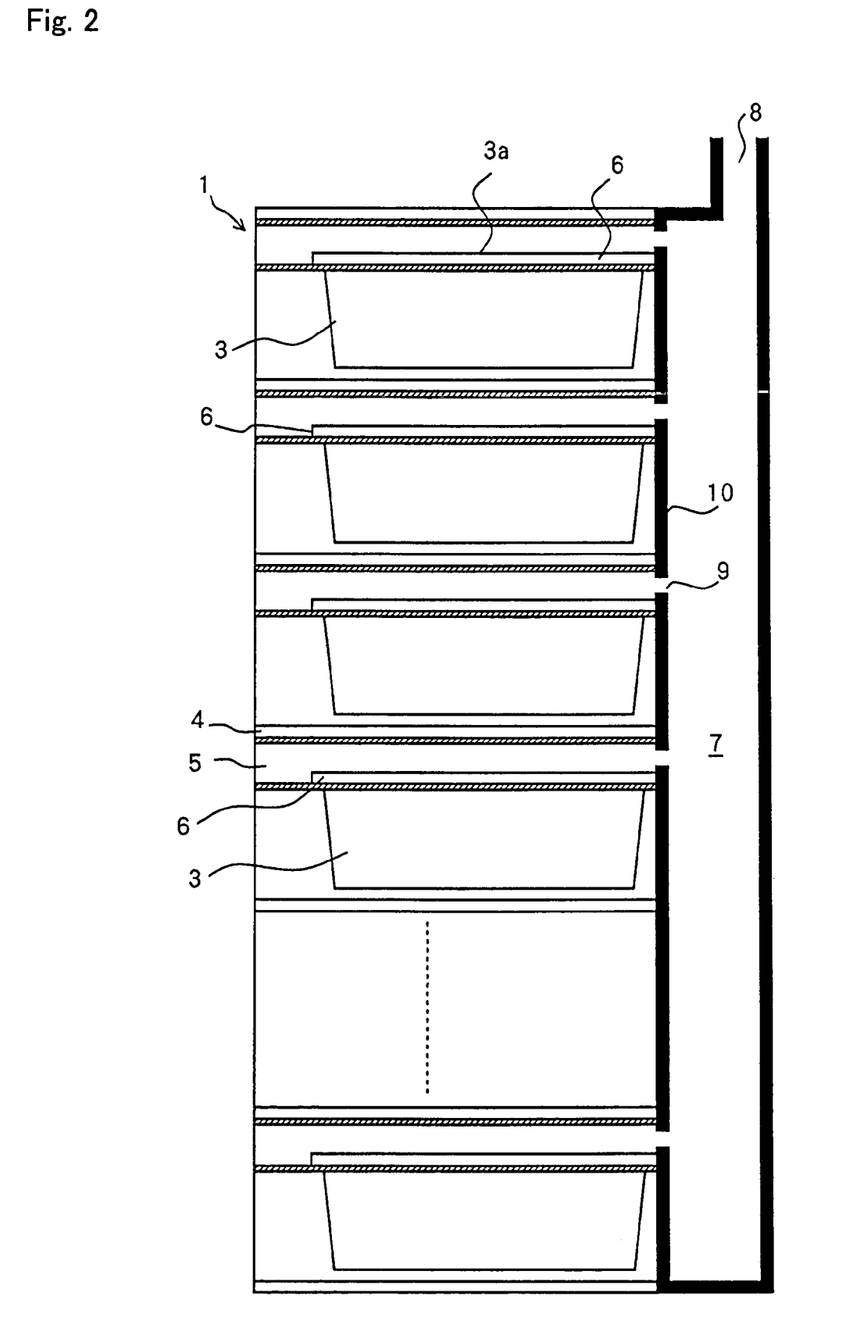
FIG. 2 is a side view of the rack of FIG. 1.

FIG. 1 is a front view of the rodent housing rack of this invention, and FIG. 2 is a side view of the rodent housing rack shown in FIG. 1.

The rodent housing rack 1 comprises multiple levels of shelves 2 that are formed between a plurality of shelf panels 4, each shelf 2 being formed from an upper and a lower shelf panels 4, and where cages 3 having an opened top surface are lined up and arranged inside each shelf 2. Each cage 3 is a box-shaped container having a rectangular-shaped opening surface 3a that opens up the entire top surface. A rim section 6 is formed around the top opening surface 3a. Small animals like rodents (not shown in the figure) are stored in the cages 3. The rim section 6 of each cage 3 is hung onto a catch section 5b (see FIG. 3), which is located on the bottom end of a hanger partition 5 having an I-shaped cross section (both ends of the shelf have a laid U shape) that is installed to the underneath surface of the top panel of the shelf 2 (upper shelf panel 4), such that it is suspended and stored inside the shelf 2. There is an exhaust chamber 7 located on the rear surface of each shelf 2, and this exhaust chamber 7 connects to an exhaust duct 8. The shelf panels 4 of each shelf 2 come in contact with and are secured to a plate 10 on the front surface of the exhaust chamber 7. The storage space of each shelf 2 is formed by the plate 10 on the front surface of this exhaust chamber 7 functioning as a back panel of the shelf, by a left and right side frame 30 of the rack and by the upper and lower shelf panels 4.

Exhaust vents 9 are formed on the back panel (the plate 10 on the front surface of the exhaust chamber 7) of each shelf 2 for each cage. The space above the cage is closed off except for the front side thereof, by the partitions that cover the top of the left and right sides of the cage and the back panel that comes in contact with the rear of the cage. The space is connected to the exhaust chamber 7 through the vents 9 so that negative pressure is maintained in that space. The exhaust vent 9 is a hole having a small diameter so that the amount of exhaust air through each exhaust vent 9 is unified. In other words, the overall amount of exhaust is set in order to obtain a nearly uniform amount of exhaust through each vent 9 regardless of the position of the exhaust vent 9.

Figure 3:
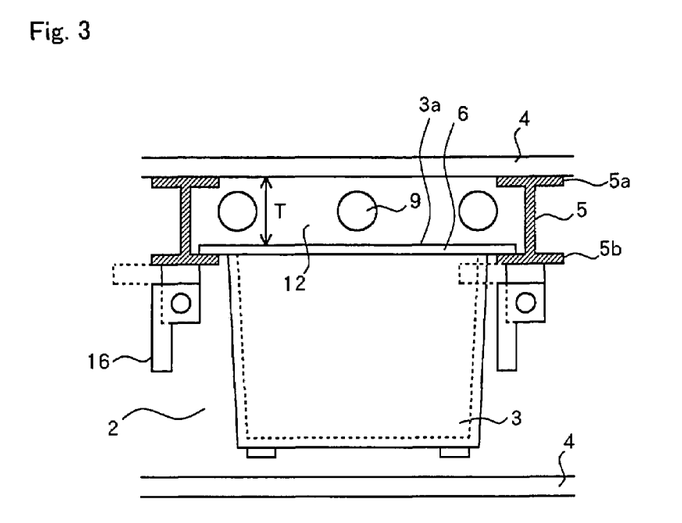
FIG. 3 is a front view of a cage that is suspended and stored inside the rack.
Figure 4:
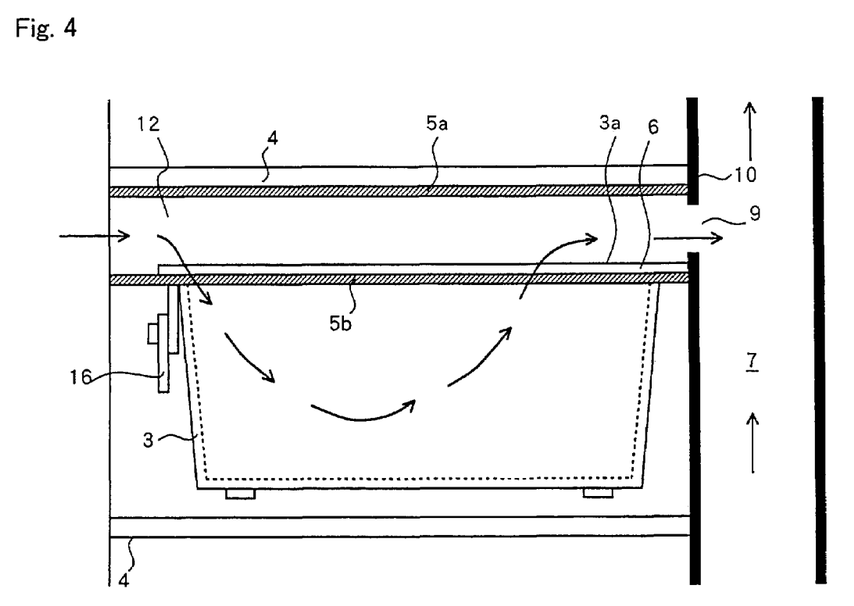
FIG. 4 is a side view of the rack of FIG. 3.

As shown in FIG. 3 and FIG. 4, the space between the opening surfaces 3a on the top of the cages 3 that are stored inside each shelf 2 and the underneath surface of the upper shelf panel 4 is closed off, by the hanger partitions 5 which close off the area above the left and right edges of the opening surface 3a, and the back panel (plate 10 of the front surface of the exhaust chamber 7) that comes in contact with the rear end of the cage 3. Only the front of the space is opened up. Exhaust vents 9 are located in this back panel (10). It is also possible to place a monitor space in the exhaust path for checking whether or not there are contagious animals among the housed animals.

FIG. 3 is a front view of a cage suspended and stored in a shelf, and FIG. 4 is a side view of the shelf shown in FIG. 3.

The settling member 5a on the top end of the hanger partition 5 is attached to the top panel (upper shelf panel 4) of the shelf 2 using an attachment means such as screw or the like, or by welding. There is a catch section 5b on the bottom end of the hanger partition 5. This hanger partition 5 can be formed from channel steel having an I-shaped, H-shaped or laid U-shaped cross section, or steel having an L-shaped cross section. The rim section 6 around the cage 3 slides along the catch section 5b such that it is suspended and stored inside the shelf 2 and is held in place by a cage stopper 16 disposed front side of the shelf for each cage. In this way, except for the front surface, the space above the cage 3 is closed off on all sides by the top panel (upper shelf panel 4), hanger partitions 5 and back panel of the shelf 2 (plate 10 of the front surface of the exhaust chamber 7). Therefore, the air that is drawn in with the use of the exhaust fan 11 (see FIG. 8) flows into the cage 3 from the opening 12 on the upper front side of the space above the cage 3, and passes completely through the inside of the cage 3 and through the exhaust vents 9 into the exhaust chamber 7 (direction of the arrows in FIG. 4). Therefore, it is possible to keep the flow of air in one-way such that the air inside the cage 3 does not flow out into the room or other part of the shelf 2.

With this kind of construction, one-way air flow is established by opening up the entire front surface of the shelves without a door, so it is not necessary to open and close the door in order to take out or put the cages 3, or to perform cleaning or other maintenance, so it is possible to improve workability. The cage 3 is suspended and stored, so it is easy to clean the bottom surface of the shelf 2. Also, since air flows separately through each cage 3, it is possible to prevent cross-contamination among cages 3 in the same shelf 2.

By making the opening height T of the opening 12 on the front top part of the cage 3 small in order to increase the velocity of air flow to a value such that a reverse flow of air does not occur, it is possible to draw in air at a constant air flow into the cage from the front surface on the top of the cage and maintain one-way flow of air through the cage, even though an upward flow of warm air occurs inside the cage due to the body temperature of the animals inside the cage. The size of this opening is set taking into consideration the air flow amount, volume of the cage and increase in temperature such that reverse flow does not occur in the one-way air flow.

Figure 5:
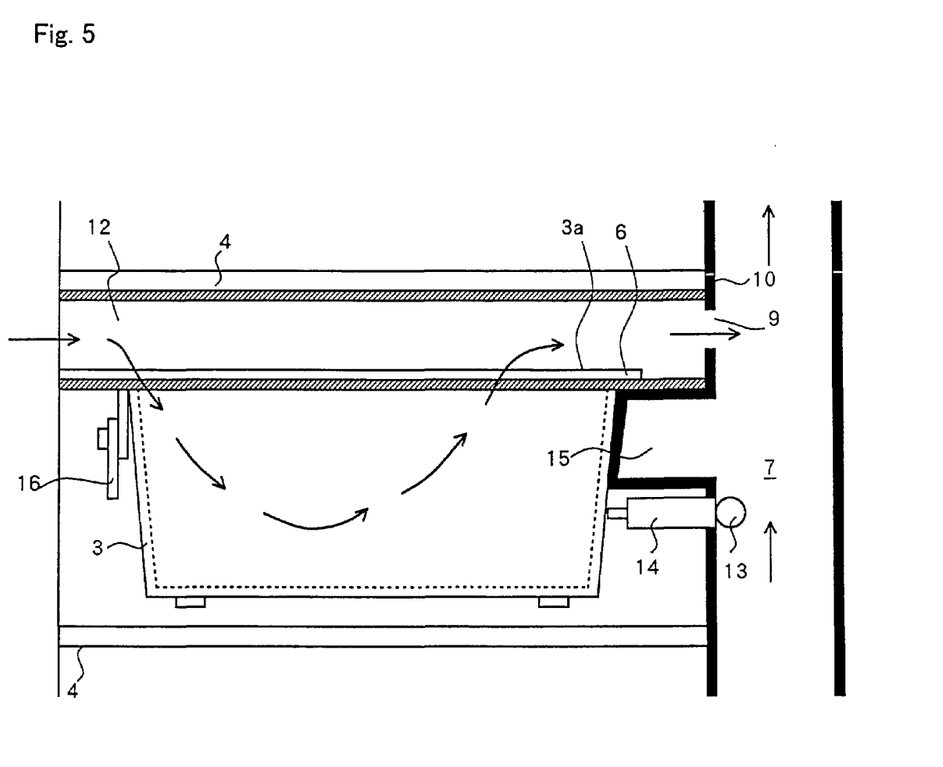
FIG. 5 is a side view showing another example of storing the cage shown in FIG. 4.

FIG. 5 is a side view of another example of storing the cage shown in FIG. 4.

As shown in the figure, when a water-supply nozzle 14 for the animal is installed in the back of the cage 3, the cage 3 must be stored inside the shelf 2 at a position further forward by an amount equal to the length of the nozzle 14. In this case, an open section is formed at the back of the cage 3. So there is a possibility that air will be drawn from the space under the cage 3 above the lower shelf panel 4 into the exhaust chamber 7 through the exhaust vents 9. In order to prevent this, a protruding section 15 is formed in the plate 10 of the front surface of the exhaust chamber 7 such that it protrudes toward the front surface, and this protruding section 15 comes in contact with the surface on the rear end of the cage. In this way, it is possible to form a closed off space above the cage 3. A water-supply pipe 13 is located inside the exhaust chamber 7, and it runs along each shelf 2 to connect to each of the nozzles 14.

Figure 6:
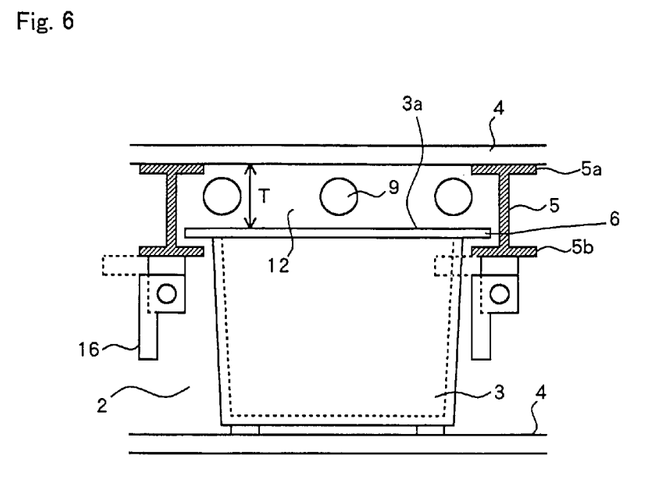
FIG. 6 is a front view of a cage that is placed on a shelf and stored in the rack.
Figure 7:
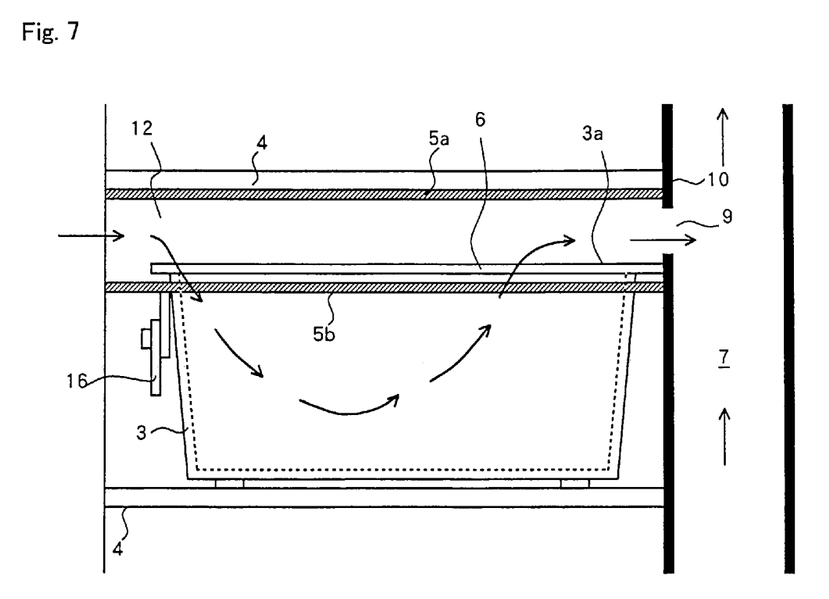
FIG. 7 is a side view of the rack shown in FIG. 6.

FIG. 6 shows another embodiment of the invention, and is a front view of a cage that is placed on the floor (lower panel 4) of the shelf 2 and stored inside the shelf, and FIG. 7 is a side view of the shelf of FIG. 6.

Different from the embodiment shown in FIG. 3 and FIG. 4 (suspended cage), according to this FIG. 6 embodiment, the cage 3 is placed on the bottom shelf panel 4. The rim section 6 around the cage 3 almost or slightly comes in contact with the web of hanger partitions 5 and the cage 3 is slid into the shelf 2 where it is stored. When there is a catch section 5b at the lower end of each hanger partition 5, the cage 3 is slid along the catch sections 5b into the shelf 2 where it is stored. Here, the distance between the underneath surface of the rim section 6 and the top surface of the catch sections 5b is very small so as not to allow the flow of air. In this way, all of the surfaces except for the front surface of the area above the cage 3 are closed off by the upper shelf panel 4, the hanger partitions 5 and the back panel of the shelf 2 (plate 10), so each cage is isolated from other cages and there is no flow of air through inside the cage 3 to any other location inside the shelf 2. Therefore, the air that is drawn in by the exhaust fan 11 (see FIG. 8) enters the cage 3 from the front opening 12 of the space above the cage 3 and flows through the cage 3 and out from the exhaust vents 9 into the exhaust chamber 7 (direction of the arrows in FIG. 7). Therefore, air inside the cage 3 does not flow into the room or other parts inside the shelf 2. By placing the cage on the bottom of the shelf 2 like this, it is possible for the hanger partitions 5 to have no catch sections 5b. In that case, the edge section 6 of the cage 3 comes in direct contact with the web of hanger partitions 5 to close off the area above the cage 3. The other construction and functions are the same as those shown in FIG. 3 and FIG. 4.

Figure 8:
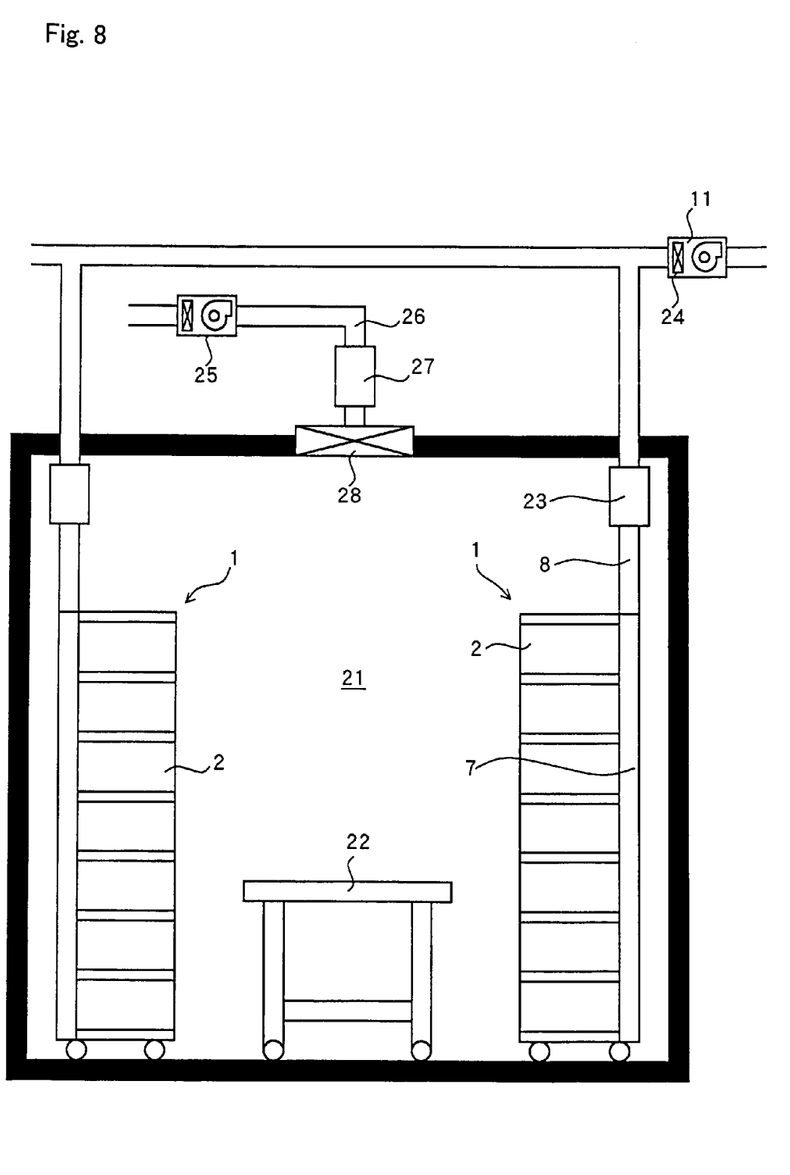
FIG. 8 is a schematic drawing showing an example of the air-conditioning equipment of the rodent housing rack of this invention.

FIG. 8 is a schematic drawing showing the air-conditioning equipment of the rodent housing rack of this invention.

As shown in the figure, the rodent housing racks 1 of this invention are placed inside a room 21. In the room 21 there is a worktable 22, and cages 3 are taken out from the shelves 2 and work is performed on this worktable 22. Each exhaust chamber 7 behind each of the rodent housing racks 1 is connected to an exhaust duct 8. The exhaust ducts 8 for a plurality of racks (two racks in this example) are connected to an exhaust fan 11. The exhaust ducts 8 are flexible ducts, so even when the arrangement of the racks 1 is changed, the position of the ducts can be adjusted. There is a filter 24 in the exhaust fan 11, and there is a damper 23 located in the exhaust duct 8 for adjusting the amount of air drawn through the rodent housing rack. Air is supplied to the room 21 from the air conditioner 25 located in an air conditioning machine room or other place. This supplied air passes through an air-supply duct 26, the amount of air is adjusted by a damper 27. The air then passes through a high-performance filter 28 such as a HEPA filter, and is finally supplied as clean air into the room 21.

Figure 9A:
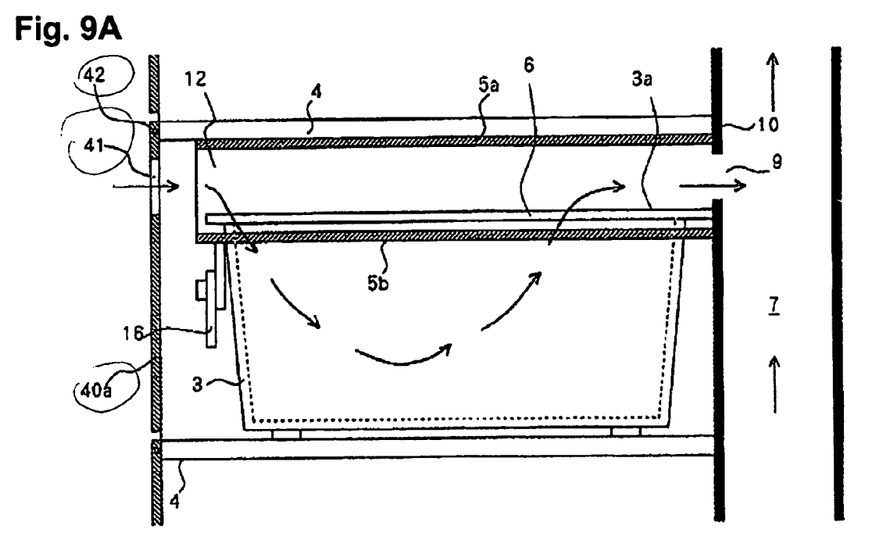
FIG. 9A is a side view showing another example of the rack shown in FIG. 6.
Figure 9B:
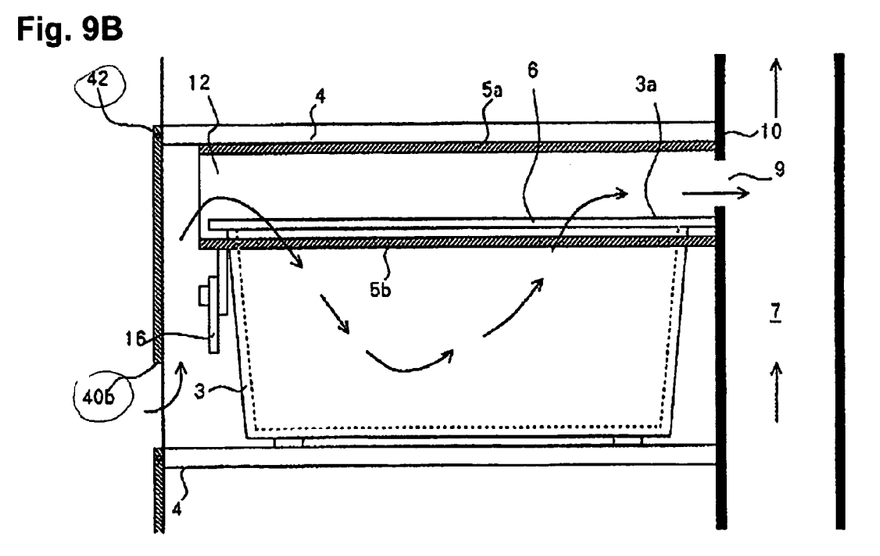
FIG. 9B is a side view showing another example of the rack shown in FIG. 6.

In the embodiments described above, construction was such that the entire front surface of the shelves were opened up without the use of doors, however, in order to further securely separate the inside of the shelves from the inside of the room and increase the reliability of preventing cross contamination, as well as to improve outward appearance, it is possible to have doors 40a or 40b located on the front surface of the shelves, as shown in FIG. 9A and FIG. 9B. In this case, openings 41 are formed on the doors 40a in order to allow one-way airflow. The doors 40b could also be such that they partially cover the front surface of the shelves such that part of the front surface of the shelves is open. The doors 40a and 40b could swing opened or closed by having a hinge 42 on the top or bottom edge, or could have any other type of appropriate construction.

With regard to openings on the doors, the size would need to be small enough to maintain one-way airflow in the area above the cages as described above, and the size of the openings on the doors could be any size as long as they are allowed for sufficient airflow.

What is claimed is:

1. A rodent housing rack that comprises:
    a rack comprising multiple levels of shelves in which a plurality of cages are arranged and stored, and where the multiple levels of shelves are formed from shelf panels;
    cages that are box-shaped containers having a rectangular-shaped opening that opens up the entire top surface; and
    an exhaust chamber located on the rear surface of said shelves and that connects all of the shelves;
    wherein negative pressure occurs inside said shelves and causes air to flow in one-way from the front of the shelves toward the rear;

wherein the space between said opening surface on the top of said cage and the bottom surface of the shelf panel above it is closed off by hanger partitions that close off the top on the left and right sides of said opening surface on the top of said cage and a back panel that comes in contact with the rear of said cage, such that only the front side of the space is open; and wherein exhaust vents are formed in said back panel such that the space above the cage is connected to said exhaust chamber through the vents.

2. The rodent housing rack of claim 1 wherein the entire front surface of said shelves is open.

3. The rodent housing rack of claim 1 wherein the doors having a specified opening or more are located on the front surface of said shelves.

4. The rodent housing rack of claim 1 wherein the size of the front opening of the space above said cage is such that a reverse flow of air does not occur in said negative-pressure one-way airflow.

5. The rodent housing rack of claim 1 wherein said back panel is a plate that forms the front surface of said exhaust chamber.

6. The rodent housing rack of claim 5 wherein said plate on the front surface of said exhaust chamber has a protruding section that comes in contact with the back part of said cages.

7. The rodent housing rack of any of claims 1 to 6 wherein said cages are placed on top of said shelf panels and stored inside said shelves.

8. The rodent housing rack of any of claims 1 to 6 wherein said cages have rim sections that go around said opening surface, and the left and right rim sections of said cages are hung on catch sections on said left and right hanger partitions such that said cages are suspended and stored inside said shelves.

* * * * *